Oct. 31, 1961 G. M. HOLLEY, JR., ET AL 3,006,327
FUEL CONTROL
Filed Jan. 30, 1956 6 Sheets—Sheet 1

FIG. 1

INVENTORS
GEORGE M. HOLLEY JR., ALTON G. DeCLAIRE,
& DONALD J. CAMERON.
BY Walter Patoroka, Jr.
ATTORNEY.

Oct. 31, 1961  G. M. HOLLEY, JR., ET AL  3,006,327
FUEL CONTROL
Filed Jan. 30, 1956  6 Sheets-Sheet 4

FIG. 4

INVENTORS
GEORGE M. HOLLEY JR.
ALTON G. DE CLAIRE JR.
DONALD J. CAMERON
BY
Walter Potoroka, Jr.
ATTORNEY United States Patent Office 3,006,327
Patented Oct. 31, 1961

3,006,327
FUEL CONTROL
George M. Holley, Jr., Grosse Pointe Park, Alton G. De Claire, Jr., Harper Woods, and Donald J. Cameron, Roseville, Mich., assignors to Holley Carburetor Company, Van Dyke, Mich., a corporation of Michigan
Filed Jan. 30, 1956, Ser. No. 562,150
22 Claims. (Cl. 123—119)

This invention relates to fuel controls adapted for use with internal combustion engines, and more particularly to fuel controls having main metering systems supplying liquid fuel under pressure.

In an ordinary carburetor, both the idle and the main metering systems supply partially-atomized liquid fuel, and the combination of the throttle valve and the venturi provide convenient means for gradual replacement of the idle system by the main metering system, and vice versa. When the throttle valve is fully closed, manifold vacuum causes fuel to flow through the idle jets only; when the throttle valve is fully open, venturi vacuum causes fuel to flow through the main jets only; at certain intermediate positions of the throttle valve, both systems are in operation.

Fuel control devices without a venturi, which is an undesirable restriction to air flow to the engine, for supplying liquid fuel under pressure are considerably more difficult to control than carburetors at engine speeds at or near idle, as well as at starting.

Accordingly, it is an object of the present invention to provide a fuel control without a venturi and having a main metering system adapted to supply liquid fuel under pressure and a complementary manifold vacuum-actuated idle system adapted to supply idle fuel.

Another object of this invention is to provide a fuel control having a main metering system adapted to supply liquid fuel under pressure, a complementary manifold vacuum-actuated idle system adapted to supply idle fuel and means adapted to regulate the amount of fuel from the main metering system so that the total fuel from the idle and/or the main metering systems is proportional to air flow to the engine.

Still another object of the invention is to provide such a fuel control device also having complementary choke, accelerating pump, starting fuel and/or starting fuel shut-off means.

A still further object of the invention is to provide a fuel control device of this type which is adapted to purge itself of air or vapor immediately upon starting the engine, as well as during engine operation.

Other objects of the invention are to provide a fuel control having a minimum of rubbing surfaces to eliminate wear and friction losses and being adapted to be mounted at any desired location on the engine.

Other objects and advantages of the invention will become apparent by reference to the following specification and the attached drawings, which illustrate a preferred embodiment of the invention and wherein:

FIG. 6 is a fragmentary view that illustrates schematically the starting fuel shut off valve that is employed in the preferred embodiment of the invention. FIG. 6, as well as the other figures, also illustrates certain conduits by which the various portions of the control are connected in order to cooperate as a complete unit.

The several figures illustrate the invention more clearly than it would be possible to do in a single figure; however, they also illustrate that certain portions of or devices included in the control may be mounted on any part of the engine and separate from one another without adversely affecting their cooperation to provide a complete improved control.

Figure 2:
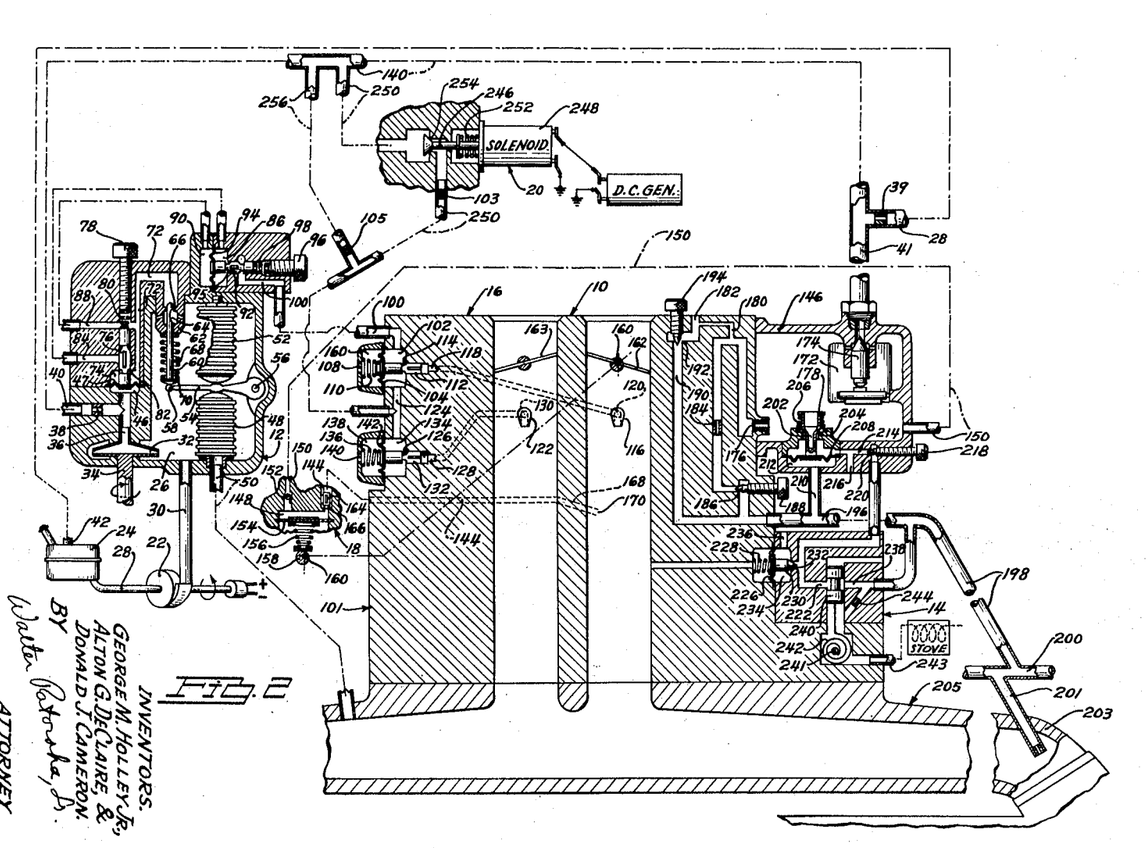
FIG. 2 is a more detailed schematic view of the device shown by FIG. 1.

Referring to FIG. 2 and the drawings in greater detail, the fuel control 10 includes a device 12 (FIG. 3) for metering fuel in response to engine speed and manifold pressure, a device 14 (FIG. 5) providing automatic choke, idle and starting fuel systems, a device 16 (FIG. 4) for adapting the control to a four-barrel manifold system, a device 18 (FIGS. 4 and 6) for providing an accelerating pump, and a device 20 (FIG. 6) for providing a starting fuel shut-off.

Figure 1:
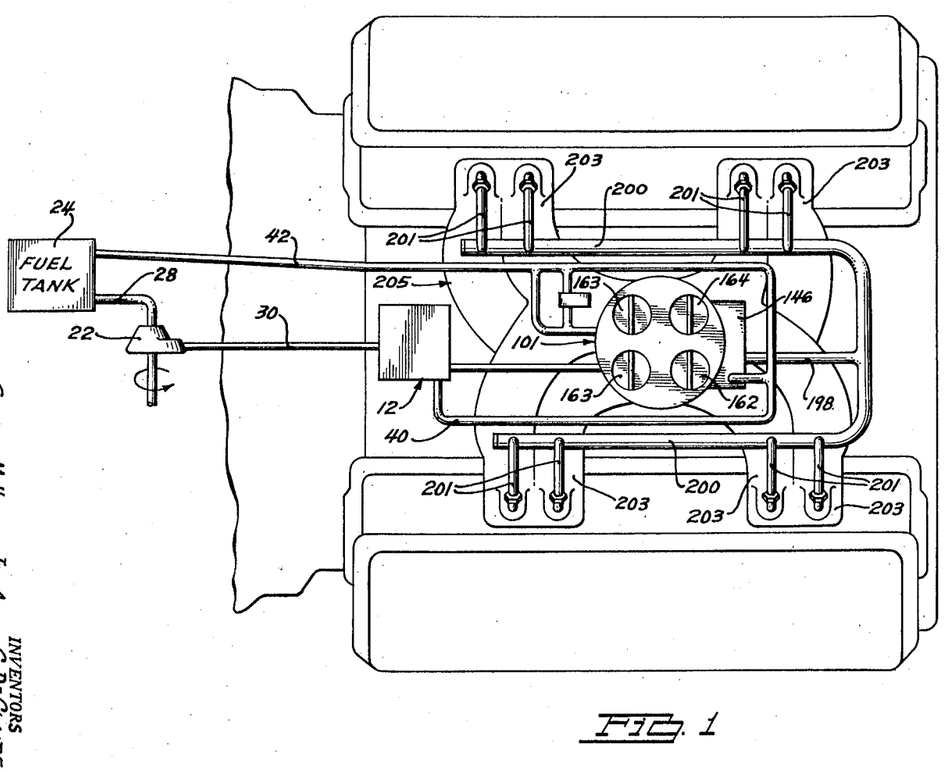
FIG. 1 is a schematic top plan view of a fuel control device embodying the invention, as installed on an engine.
Figure 3:
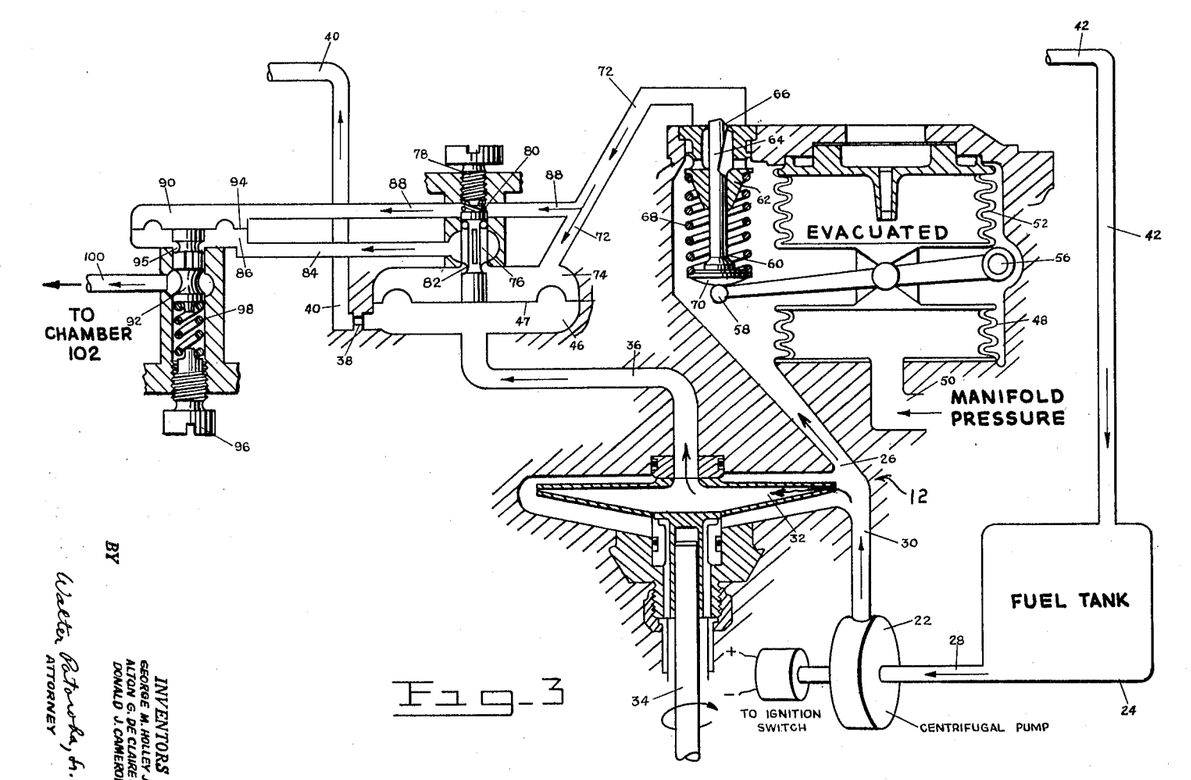
FIG. 3 is a fragmentary schematic view illustrating that portion of the control having means by which engine speed and manifold pressure meter the fuel in the main metering system.

Referring now to FIGS. 1, 2 and 3, a fuel pump 22, of suitable type and capacity, delivers fuel under pressure from tank 24 to chamber 26 through the conduits 28 and 30. The device 12 is formed to provide an impeller or vane type centrifugal pump 32 which rotates in accordance with engine speed within chamber 26 by reason of its being coupled to shaft 34 which itself is driven in accordance with engine speed. Since the pressure generated by pump 22 always exceeds that of pump or impeller 32, it will be apparent that the rotation of speed sensing impeller 32 maintains a pressure differential between chamber 26 and conduit 36, the pressure in chamber 26 being greater than the pressure in conduit 36 and the differential depending upon the speed of the engine. Conduit 36, which terminates at the center of impeller 32, leads to orifice 38 which permits a small amount of fuel to return to the tank 24 through conduits 40 and 42 and orifice 39. In lieu of impeller 32, any other equivalent device responsive to engine speed that creates the above described pressure differential could be employed. Chamber 46, of which a flexible diaphragm 47 forms one wall, also communicates with conduit 36.

Engine intake manifold pressure is continuously admitted to the bellows 48 through conduit 50. Therefore, bellows 48 continuously act together with evacuated bellows 52 in moving arm 54 about the fixed pivot 56 according to absolute engine manifold pressure. The free end 58 of arm 54 causes the needle valve 60 to slide axially within bushing 62; since valve 60 has a suitably concavely contoured portion 64, the area of the orifice 66 is varied to a predetermined extent in accordance with absolute engine manifold pressure.

The contoured portion 64 is preferably shaped to introduce an error in fuel flow in the direction of greater fuel flow at higher manifold pressures and higher engine speeds, for a purpose to be described. Compression spring 68 assures constant contact between the spring-retaining shouldered end 70 of valve 60 and the free end 58 of arm 54. It is also apparent that any suitable equivalent means could be substituted for the above manifold pressure responsive device.

From metering orifice 66, fuel passes through conduit 72 and into chamber 74 of which diaphragm 47 also forms a surface. Whenever the fuel pressure in chamber 74, which is proportional to the pressure in chamber 26, exceeds the fuel pressure in chamber 46, the flexible diaphragm 47 is displaced toward or into chamber 46.

Valve 76, which is biased away from adjustable nut 78 by means of compression spring 80, is secured to the center of diaphragm 47. Thus, when diaphragm 47 is displaced toward chamber 46, it moves valve 76 to open orifice 82 so that a greater flow of fuel is permitted from chamber 74 through orifice 82 and conduit 84 and into chamber 86. The same movement of valve 76 also permits greater flow of fuel from conduit 72 through conduit 88 and into chamber 90. However, when the fuel pressure in chamber 46 exceeds that in chamber 74, flexible diaphragm 47 is displaced toward chamber 74 so as to restrict the above fuel flow. The action of diaphragm 47 and valve 76 equalizes the pressures on both sides of diaphragm 47. Because of the equalizing action, the fuel pressure downstream from metering orifice 66 will always be equal to the fuel pressure in conduit 36. In other words, the fuel pressure downstream of orifice 66 will vary in accordance with engine speed and manifold pressure, as does the pressure in conduit 36.

The preload of spring 80 is preferably such that fuel flow is increased more at low speeds and higher manifold pressure than it is at high speeds and lower manifold pressure. The reason for this is explained below, along with the explanation of the preferred shape of the contoured portion 64.

A constant pressure drop across metering orifice 82 is assured by valve 92, which operates in a manner similar to valve 76. As described above, fuel from metering orifice 66 enters chamber 90 of which flexible diaphragm 94 forms a surface. Likewise, as already described, fuel from metering orifice 82 enters chamber 86 of which diaphragm 94 also forms a surface. Valve 92 is connected to the center of diaphragm 94 and operates as a function of the pressure drop (across orifice 82) to open or close orifice 95. The adjustment screw 96 and spring 98 provide means for selecting any desired pressure drop across metering orifice 82.

Figure 4:
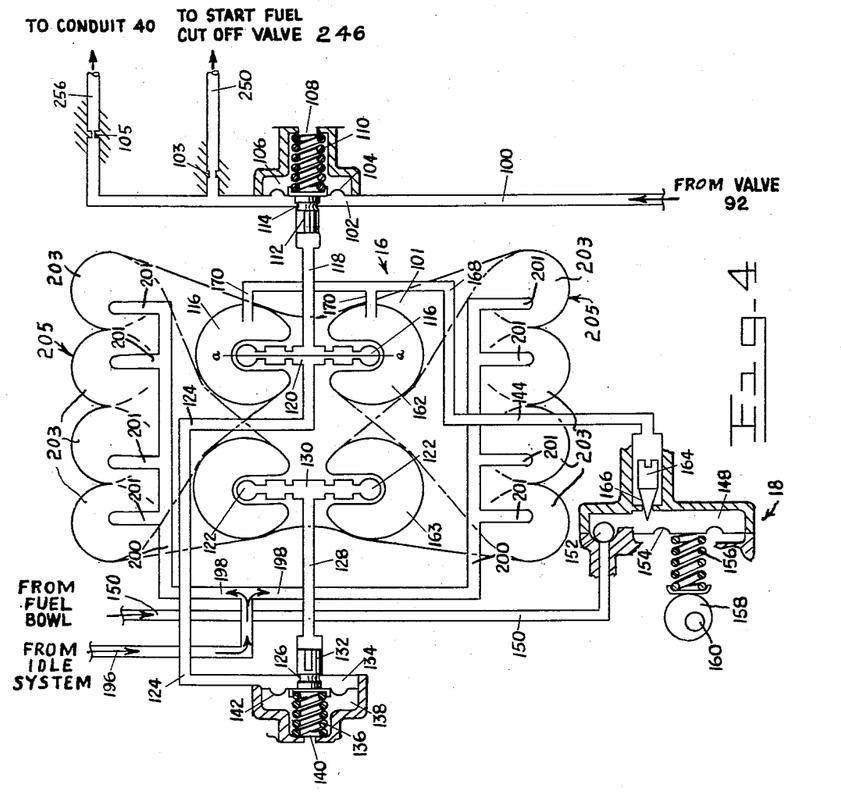
FIG. 4 is a fragmentary view illustrating schematically the means for adapting the control to a four-barrel manifold. This view also illustrates an accelerating pump employed in the control.

Referring now to FIG. 4, fuel metered in accordance with engine speed and manifold vacuum flows from orifice 95 through conduit 100 and into chamber 102 which may either be separately provided or located in the throttle body 101. FIGS. 2 and 4 illustrate schematically a typical carburetor throttle body 101 for adapting the control to the usual four-barrel manifold, wherein each of the two primary barrels feeds one bank of four engine cylinders for normal driving and each of the two secondary barrels supplements one of the primary barrels at higher speeds when the capacity of the primary barrels is not sufficient. It is to be understood, however, that the invention is not in any way limited to a four-barrel manifold system, but may be adapted to any desired manifold system. Flexible diaphragm 104, which forms a surface of chamber 102, also forms a wall of chamber 106 which is vented to atmosphere at 108. Diaphragm 104 is normally urged by spring 110 in a manner to cause valve 112, which is secured to diaphragm 104, to close orifice 114. However, whenever a sufficient predetermined fuel pressure builds up in chamber 102 due to the restrictions of jets 103 and 105, diaphragm 104 is displaced against spring 110 so as to permit fuel to flow through orifice 114 and into nozzles 116 by way of conduit 118 and chamber 120.

Fixed jet 105 bleeds a constant amount of fuel flow back to the tank 24 at all engine speeds and manifold pressures.

Since the invention has been disclosed for illustrative purposes as a typical four-barrel installation, the set of secondary nozzles 122 provided for high speed operation only must be provided with fuel at the proper time. Fuel flows rfom chamber 120 through conduit 124, orifice 126, conduit 128 and chamber 130 and into the nozzles 122. It is to be noted that orifice 126 is opened and closed by valve 132 when the pressure in chamber 134 is sufficient to overcome spring 136 in chamber 138 which is vented to atmosphere at 140, in the same manner as orifice 114 is opened and closed by valve 112. The load of spring 136 is of course greater than that of spring 110 so that greater fuel pressure at high speed is required to displace diaphragm 142 than that required to displace diaphragm 104. Thus, the secondary nozzles 122 will be supplied with fuel only at the higher speeds for which they are provided.

Conduit 144 supplies acceleration fuel only to the primary barrels by means of nozzles 170 in a manner now to be described. Fuel from the float bowl 146 (FIGS. 2 and 5) enters chamber 148 through conduit 150 and check valve 152. Flexible diaphragm 154, which forms a surface of chamber 148, is displaced inwardly against spring 156 by means of an eccentric 158 mounted in any suitable manner to rotate about pivot 160 with primary throttle plates 162, as shown schematically by FIGS. 2 and 4. The displacement of diaphragm 154 on opening of the throttle plates 162 causes fuel in chamber 148 to lift the gravity operated valve 164, which would actually be positioned vertically, and to open orifice 166 so that acceleration fuel may flow through conduits 144 and 168 to the nozzles 170. This provides an immediate response to acceleration independent of and complementary to the main metering system.

Figure 5:
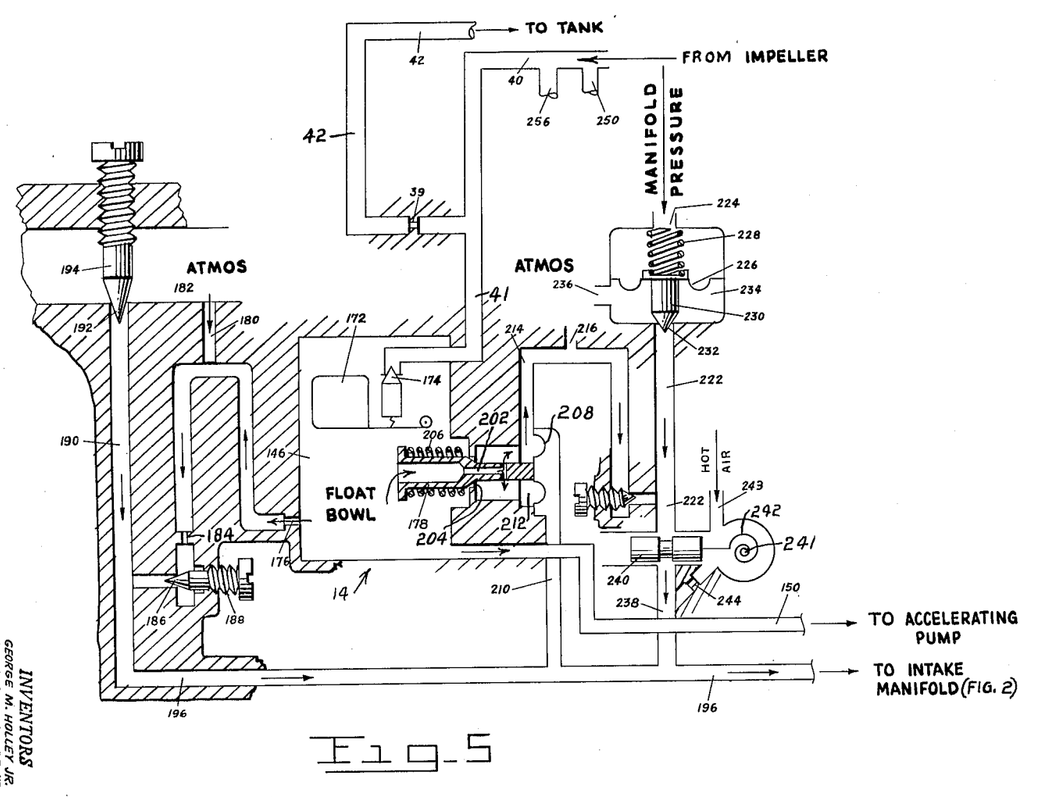
FIG. 5 is a fragmentary schematic view illustrating that portion of the control which includes the complementary automatic choke, idle and starting fuel systems.

The automatic choke, start and idle systems shown by FIGS. 2 and 5 are also separate from and independent of the main fuel metering system shown by FIGS. 2 and 3, but these systems complement the pressurized main metering system to provide a control which results in optimum engine performance under all conditions of operation. Fuel in lines 40 and 41, the pressure of which is dependent in part upon the size of jets 38 and 39, enters the float bowl 146 when the float 172 opens the valve 174 in the usual manner well known in carburetors. Fuel for the idling and start systems is supplied through jet 176 and metering valve 178, as described below.

Fuel leaving the float bowl 146 through jet 176 is mixed with air entering passage 180 from any suitable source 182. The fuel-air mixture is then metered through fixed jet 184 and orifice 186 which may be adjusted by means of screw 188. The fuel-air mixture passing through orifice 186 is again mixed with air which enters passage 190 from source 182 through the orifice 192, the latter being adjusted by screw 194. The mixture then passes through passages 196 and 198 to the passages 200 and 201 (FIGS. 1, 2 and 4) which feed the individual intake parts 203 of the intake manifolds 205 of the engine (not shown).

Fuel leaving the float bowl 146 through metering valve 178 is used for cold starting. Metering valve 178 includes the fixed orifice 202 and the variable metering orifice 204, and spring 206 acts on valve 178 to keep metering orifice 204 normally open. Valve 178 is connected at the other end thereof to a flexible diaphragm 208. Whenever the pressure in passages 196 and 210 decreases, the pressure differential across diaphragm 208 moves valve 178 to the right and closes orifice 204. Orifice 202 is always open, however, and fuel passing therethrough into chamber 212 and passage 214 is mixed with air entering at atmospheric air bleed 216. Adjustable needle valve 218 meters this fuel-air mixture through orifice 220 into passage 222 where additional air may be introduced by valve 230. The amount of air introduced into passage 222 varies as a function of manifold pressure at 224 acting on the flexible diaphragm 226, the travel of which is predetermined by spring 228 and the diaphragm area and to which valve 230 is attached for opening and closing orifice 232. Chamber 234 is vented to atmosphere at 236.

Passage of the fuel-air mixture from orifice 220 into passages 238 and 196 is controlled by valve 240, and movement of valve 240, which is in effect a variably positioned choke valve, is a function of exhaust manifold temperature (air heated by exhaust gases) flowing from opening 243 across any suitable thermo-sensitive element, such as thermostatic coil spring 242 anchored at 241 connected at its other end to valve 240, and then through a small fixed jet 244. The hotter the exhaust manifold gases, the more valve 240 will close off the passages 222—238 from a fully opened position at predetermined low manifold temperature. The fuel-air mixture in passage 238 is added to that in passage 196 and both mixtures flow to the intake manifold feeder conduits 200 and 201.

Figure 6:
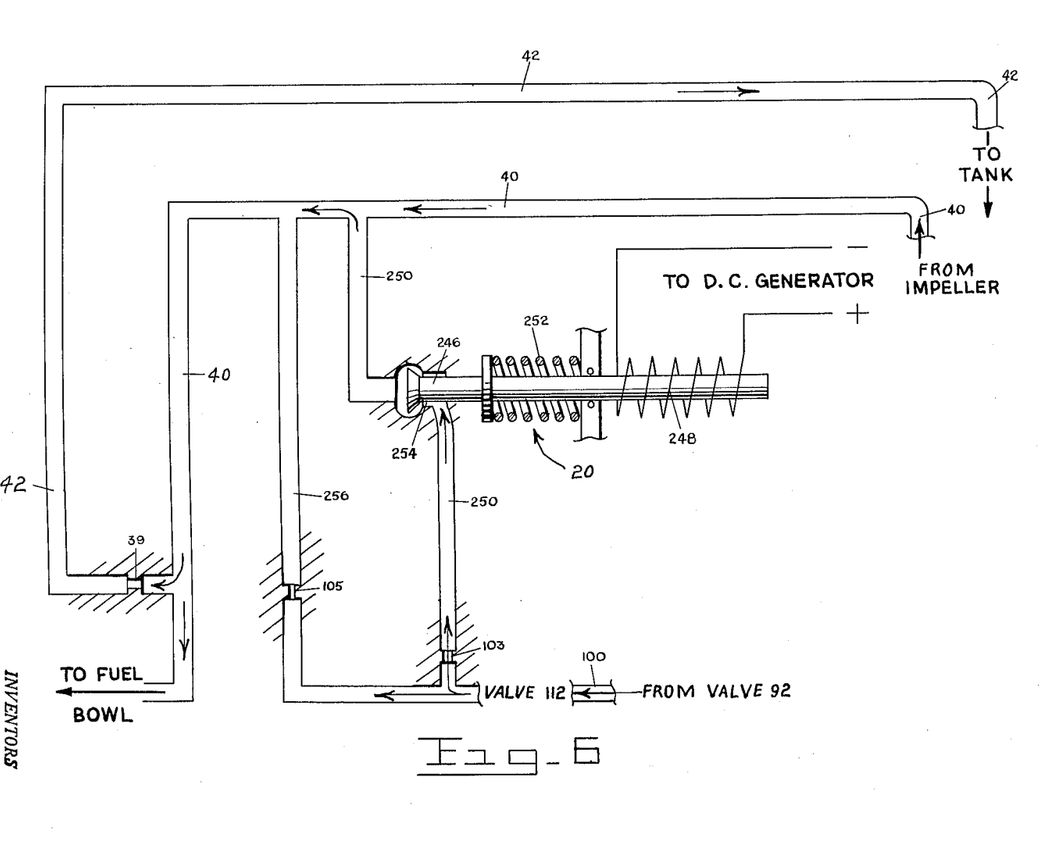

As shown by FIGS. 2 and 6, a valve 246 operated by solenoid 248 is provided in return conduit 250 to prevent fuel from draining into manifold feeder conduits 200 when the engine is not operating. The valve 246 is normally held open by spring 252, but it is closed when the solenoid 248 is energized by starting the engine. When valve 246 is open and assuming that the float bowl 146 is already at proper level, fuel from chamber 102 may pass back to the tank 24, through jet 103, orifice 254, conduit 250, conduit 40, jet 39 and conduit 42. When valve 246 closes orifice 254, fuel from chamber 102 flows into nozzles 116 and 122 as already described above, provided orifices 114 and 126 are open. A small amount of fuel may always be returned to tank 24 by way of the relatively small jet 105 and conduit 256 and the above passages.

*Operation*

When the engine has not been operated for a period of time the fuel may drain from the chamber 26 and the conduit 36 and other parts of the fuel control back to the tank 24.

As soon as the ignition switch is closed and before the engine is cranked, the constant speed pump 22 begins to deliver fuel from the tank 24. Since the manifold pressure at this time is substantially atmospheric, the positions of the bellows 48 and 52 are such that the valve 60 is raised from the position shown by FIGS. 2 and 3 to fully open the orifice 66. Springs 80 and 98 position the valves 76 and 92 respectively so that the orifices 82 and 95 are fully open. Since the engine and the generator are not operating, the spring 252 maintains the valve 246 in a position so that orifice 254 is fully open. In this condition of the control, the fuel from pump 22 may flow freely through the device 12 shown by FIGS. 2 and 3 and the lines shown in FIGS. 2 and 6 to purge any air or vapors trapped therein back to the tank 24. During this period the fuel bowl 146 will be filled to the proper level if this is necessary. It is apparent that what is described above will take place in a very short time.

When the engine is cranked during a cold start, the impeller 32 rotates relatively slowly; this low speed operation has no practical effect on the pressures in conduit 36 and chamber 26, and the manifold pressure at this engine speed has little or no affect on the bellows 48. Generator speed during cranking is not sufficient to close the valve 246, and manifold pressure at this low engine speed is again not sufficient to overcome the affect of spring 228 on valve 230, or the affect of spring 206 on valve 178. Thus, valve 230 is closed, and valve 178 is still in a position so that orifice 204 is fully open. Since the engine is cold, the thermostatic spring 242 positions valve 240 so that passages 222 and 238 are in full communication.

In the above condition during cranking from cold start, fuel from the fuel bowl 146 passes through both the fixed restricted orifice 202 and the large variable orifice 204, through the adjustable orifice 220 and thence through passage 196 to the manifold port feeder lines 201. At this time fuel also is drawn through the orifices 176, 184 and 186, and thence through the passage 196 to the inlet feeder lines 201.

As the engine begins to idle the manifold vacuum in passage 196 gradually pulls the diaphragm 208 to progressively close the orifice 204. The increased manifold pressure also moves the diaphragm 226 against spring 228 to admit atmospheric pressure to passage 222 and increase the air flow to the engine for fast idle. This reduces the amount of fuel drawn through passage 214 and orifice 220. Eventually, as the engine becomes heated, the thermostatic spring 242 causes the valve 240 to completely close the passage 222 so that at hot idle the fuel is supplied through orifice 186 only. As the engine comes to idle, the solenoid 248 is energized to close orifice 254. This causes fuel delivered by the unit 12, except that which may still pass through the relatively small jet 105, to be available for supply to the nozzles 116 and 122 when the pressures in chambers 102 and 134 are sufficient. In other words, fuel can no longer be by-passed through the relatively large jet 103.

As the throttle is depressed to open the throttle plates 162 and admit more air the engine speeds up. This causes the impeller 32 to speed up to provide the above described pressure differential between conduit 36 and chamber 26. Diaphragms 47 and 94 then come into operation as described above to adjust the pressures in the device shown by FIGS. 2 and 3.

The effective manifold pressure in bellows 48 operates the valve 60 to permit the required flow of fuel through orifice 66 to adjust the pressures of the device shown by FIGS. 2 and 3 to that required to open the orifices 114, and 126 if necessary. Orifices 82 and 95 are also suitably adjusted by the pressures in the system as already described above.

When the primary throttle plates 162 are opened suddenly, the diaphragm 154 is raised by eccentric 158 to open orifice 166 and force acceleration fuel to the jets 170 in the primary barrels.

It has been pointed out that the invention provides means for controlling the flow of manifold vacuum-actuated idle fuel and fuel from a main metering system having no venturi so that the total fuel is at all times proportional to air flow to the engine. For this purpose, the fixed jet 105 bleeds back to tank 24 a constant amount of fuel flow at all engine speeds and manifold pressures, which makes the metered fuel flow from the main metering system to the engine lean. The manifold vacuum-actuated idle system adds fuel at all engine speeds and at low manifold pressures. The shape of contoured portion 64 is such that the fuel flow through orifice 66 is greater than necessary at high engine speeds and high manifold pressures, and the effect of spring 80 is to add more fuel than necessary at low engine speeds and high manifold pressures. The combined effect of the above means make possible the effective combination of the main metering and other fuel systems.

It is apparent, from the preceding description, that there has been provided a complete improved fuel control in which the main metering system is a pressure system; in the particular embodiment shown, the system is responsive to engine speed and manifold pressure. In addition to the main metering system, however, the control provides independent and separately mountable choke, idle, starting fuel, starting fuel cut-off and accelerating pump means; these latter means cooperate with the main metering system to improve the operation of the control over a wide range of conditions and make the control similar to the conventional carburetor in these respects. While the control has a number of moving parts, these parts include a minimum of rubbing surfaces that are subject to wear and friction losses. The control is thus sensitive to lesser pressure differentials than would otherwise be possible. The control is constructed so that it quickly purges itself of entrapped air or vapors as soon as the engine ignition is turned on.

While a preferred modification of the invention is shown, it is apparent that other modifications thereof may be made within the scope of the invention, and no limitations are intended except those in the appended claims.

What is claimed is:

1. A fuel supply system for an internal combustion engine having an intake manifold and a throttle valve therein, comprising manifold vacuum-actuated means for supplying partially-atomized idle fuel to said intake manifold on the engine side of said throttle valve and a main metering system having means for supplying additional liquid fuel under a constant positive pressure to said intake manifold at engine speeds above idle and in quantities dependent upon engine speed and manifold pressure, said main metering system having means for increasing the flow of said liquid fuel at a rate such that the total quantity of fuel is proportional to air flow through said intake manifold.

2. A fuel supply system for an internal combustion engine having an intake passage and an air valve therein, comprising engine vacuum-actuated means for supplying idle fuel to said intake passage below said air valve and a main metering system having means for supplying additional liquid fuel under a constant positive pressure to said intake passage at engine speeds above idle, said main metering system having means for increasing the flow of said liquid fuel at a rate such that the total quantity of fuel is proportional to air flow through said intake passage.

3. A fuel supply system for an internal combustion engine having an unrestricted intake passage except for a throttle valve therein, comprising engine vacuum-actuated means for supplying idle fuel to said intake passage below said throttle valve and a main metering system having means for supplying additional liquid fuel under a constant positive pressure to said intake passage at engine speeds above idle, said main metering system having means for increasing the flow of said liquid fuel at a rate such that the total quantity of fuel is proportional to air flow through said intake passage.

4. The combination of an internal combustion engine having an unrestricted intake passage except for a throttle valve therein and a fuel supply system for said engine, comprising engine vacuum-actuated means for supplying idle fuel to said intake passage below said throttle valve and a main metering system having means for supplying additional liquid fuel under a constant positive pressure to said intake passage at engine speeds above idle, said main metering system having means for increasing the flow of said liquid fuel at a rate such that the total quantity of fuel is proportional to air flow through said intake passage.

5. A fuel supply system for an internal combustion engine having an intake passage and a throttle valve therein, comprising engine manifold vacuum-actuated means for supplying idle fuel to said intake passage and a main metering system having means for supplying additional liquid fuel under a constant positive pressure to said intake passage above said throttle valve at engine speeds above idle and in quantities dependent upon engine speed and manifold pressure, said main metering system having means for increasing the flow of said liquid fuel at a rate such that the total quantity of fuel is proportional to air flow to said engine.

6. A fuel supply system for an internal combustion engine having an intake passage and a throttle valve therein, comprising engine manifold vacuum-actuated means for supplying idle fuel to said intake passage and a main metering system having means for supplying additional liquid fuel under a constant positive pressure to said intake passage above said throttle valve at engine speeds above idle, said main metering system having means for increasing the flow of said liquid fuel at a rate such that the total quantity of idle and main fuel is proportional to air flow to said engine.

7. A fuel supply system for an internal combustion engine having an intake passage and a throttle valve therein, comprising engine manifold vacuum-actuated means for supplying partially-atomized idle fuel to said intake passage below said throttle valve and a main metering system having means for supplying additional liquid fuel under a constant positive pressure to said intake passage at engine speeds above idle and in quantities dependent upon engine speed and manifold pressure, said means for supplying partially-atomized idle fuel becoming progressively inoperative and said main metering system becoming progressively operative with increasing engine speed and vice versa, said main metering system having means for increasing the flow of said liquid fuel at a rate such that the total quantity of fuel is proportional to air flow through said intake passage.

8. A fuel supply system for an internal combustion engine having an intake passage and a throttle valve therein, comprising engine manifold vacuum-actuated means for supplying idle fuel to said intake passage below said throttle valve and a main metering system having means for supplying additional liquid fuel under a constant positive pressure to said intake passage at engine speeds above idle and in quantities dependent upon engine speed and manifold pressure, said means for supplying idle fuel becoming progressively inoperative and said main metering system becoming progressively operative with increasing engine speed and vice versa, said system having means for increasing and decreasing the flow of said liquid fuel at a rate such that the total quantity of fuel is at all times proportional to air flow through said intake passage.

9. In a fuel supply device for internal combustion engines having an intake manifold and a throttle valve, a main metering system having means for controlling the flow of liquid fuel as a function of engine speed and manifold pressure and means operative at all engine speeds for maintaining said liquid fuel at a predetermined pressure, and means for admitting said liquid fuel to said engine at or above said predetermined pressure and by-passing said engine below said predetermined pressure.

10. In a fuel supply device for internal combustion engines having an intake manifold and a throttle valve, a main metering system having means for controlling the flow of liquid fuel as a function of engine speed and means operative at all engine speeds for maintaining said liquid fuel at a predetermined pressure, and means for admitting said liquid fuel to said engine at or above said predetermined pressure and by-passing said engine below said predetermined pressure.

11. In a fuel supply device for internal combustion engines having an intake manifold and a throttle valve, a main metering system having means for controlling the flow of liquid fuel as a function of manifold pressure and means operative at all engine speeds for maintaining said liquid fuel at a predetermined pressure, and means for admitting said liquid fuel to said engine at or above said predetermined pressure and by-passing said engine below said predetermined pressure.

12. In a fuel supply device for internal combustion engines having an intake manifold with a throttle valve and a fuel tank associated therewith, a main metering system having means for controlling the flow of liquid fuel as a function of engine speed and manifold pressure and means operative at all engine speeds for maintaining said liquid fuel at a predetermined pressure, and means for admitting said liquid fuel to said engine at or above said predetermined pressure and by-passing fuel to said tank at pressures below said predetermined pressure.

13. In a fuel supply device for internal combustion engines having an intake manifold with a throttle valve and a fuel tank associated therewith, a main metering system having means for controlling the flow of liquid fuel as a function of engine speed and manifold pressure and means operative at all engine speeds for maintaining said liquid fuel at a predetermined pressure, and means for admitting said liquid fuel to said engine at or above said predetermined pressure and by-passing fuel to said tank at pressures below said predetermined pressure, said system also having means for continuously venting air and vapors back to said tank.

14. In a fuel supply device for internal combustion engines having an intake manifold with a throttle valve and a fuel tank associated therewith, a main metering system having means for controlling the flow of liquid fuel as a function of engine speed and manifold pressure and means operative at all engine speeds for maintaining said liquid fuel at a predetermined pressure, and means for admitting said liquid fuel to said engine at or above said predetermined pressure and by-passing fuel to said tank at pressures below said predetermined pressure, said system also having means for continuously venting air and vapors back to said tank and additional means operative at starting only for said purpose.

15. A fuel supply system for an internal combustion engine having an intake passage and a throttle valve therein, comprising separate engine manifold vacuum-operated means for providing progressively reduced quantities of fuel for cold start, cold idle and warm idle conditions of engine operation, respectively, said separate means all being operative at cold start and said means being rendered inoperative in the above order under said other conditions of engine operation, the first of said means being rendered inoperative by manifold vacuum at idle, the second of said means being rendered inoperative by a combination of manifold vacuum at idle and engine temperature responsive means adapted to shut off the flow of said fuel.

16. A fuel supply system for an internal combustion engine having an intake passage and a throttle valve therein, comprising main metering means for supplying liquid fuel under pressure at engine speeds above idle and separate engine manifold vacuum-operated means for providing progressively reduced quantities of fuel for cold start, cold idle and warm idle conditions of engine operation, respectively, said separate means all being operative at cold start and some of said means being rendered inoperative in the above order under said other conditions of engine operation, the first of said means being rendered inoperative by engine manifold vacuum at idle, the second of said means being rendered inoperative by a combination of engine manifold vacuum at idle and engine temperature responsive means adapted to reduce or completely shut off the flow of fuel supplied by said first and second means.

17. In a fuel supply system for internal combustion engines having an unrestricted intake passage except for a throttle valve therein, the combination of engine manifold vacuum-actuated means for supplying decreasing amounts of fuel during cold start, cold idle and warm idle conditions of operating of said engine, respectively, at a point below said throttle valve, and main metering means responsive to engine speed and engine manifold vacuum for supplying additional liquid fuel to said intake passageway at engine speeds above idle, said system having means for providing a gradual transition from idle fuel to main fuel and vice versa, said means providing at all times during said transition a total fuel flow proportional to air flow through said intake passage.

18. The combination of claim 8, further characterized by combined manifold vacuum and engine temperature responsive means for progressively decreasing the amounts of said idle fuel, said manifold vacuum means being adapted to bleed air into said intake manifold to reduce said vacuum and said engine temperature responsive means being adapted to reduce or fully cut off the flow of some of said idle fuel.

19. A fuel supply system for an internal combustion engine having an air intake passage and an air valve therein, comprising engine vacuum-actuated means for supplying idle fuel to said intake passage below said air valve and a main metering system having means for supplying additional liquid fuel under a positive pressure to said intake passage at engine speeds above idle, said main metering system having means for increasing the flow of said liquid fuel at a rate such that the total quantity of fuel is proportional to air flow through said intake passage.

20. A fuel supply system for an internal combustion engine having an unrestricted air intake passage except for a throttle valve therein, comprising engine vacuum-actuated means for supplying idle fuel to said intake passage below said throttle valve and a main metering system having means for supplying additional liquid fuel under a positive pressure to said intake passage at engine speeds above idle, said main metering system having means for increasing the flow of said liquid fuel at a rate such that the total quantity of fuel is proportional to air flow through said intake passage.

21. A fuel supply system for an internal combustion engine having an unrestricted intake passage except for a throttle valve therein, comprising throttle position responsive means for supplying idle fuel to said intake passage below said throttle valve and a main metering system having means for supplying additional liquid fuel under a positive pressure to said intake passage at engine speeds above idle, said main metering system having means for increasing the flow of said liquid fuel at a rate such that the total quantity of fuel is proportional to air flow through said intake passage.

22. A fuel supply system for an internal combustion engine having an intake manifold and a throttle valve therein, comprising manifold vacuum-actuated means for supplying partially-atomized idle fuel to said intake manifold on the engine side of said throttle valve and a main metering system having means for supplying additional liquid fuel under a positive pressure to said intake manifold at engine speeds above idle and in quantities dependent upon one or more engine operating conditions, said main metering system including means for increasing the flow of said liquid fuel at a rate such that the total quantity of fuel is proportional to air flow through said intake manifold.

References Cited in the file of this patent

UNITED STATES PATENTS

| | | |
|---|---|---|
| 1,956,992 | Mallory | May 1, 1934 |
| 2,035,177 | Mennesson | Mar. 24, 1936 |
| 2,038,157 | Aseltine et al. | Apr. 21, 1936 |
| 2,440,567 | Armstrong et al. | Apr. 27, 1948 |
| 2,451,289 | Jarvis | Oct. 12, 1948 |
| 2,531,780 | Mock | Nov. 28, 1950 |